United States Patent [19]

Takeda et al.

[11] Patent Number: 4,760,526
[45] Date of Patent: Jul. 26, 1988

[54] METHOD FOR STORING DATA INTO A FILE DEVICE AND FOR DATA RETRIEVAL

[75] Inventors: Haruo Takeda, Kawasaki; Atsuo Niimi, Yokohama; Kuniaki Tabata, Tokyo, all of Japan

[73] Assignee: Hitachi, Ltd., Tokyo, Japan

[21] Appl. No.: 865,454

[22] Filed: May 21, 1986

[30] Foreign Application Priority Data

May 22, 1985 [JP] Japan .................................. 60-108123

[51] Int. Cl.$^4$ ............................................. G06F 15/40
[52] U.S. Cl. ................................................... 364/300
[58] Field of Search ... 364/200 MS File, 900 MS File, 364/300

[56] References Cited
U.S. PATENT DOCUMENTS 4,209,845 6/1980 Berger et al. ....................... 364/900

OTHER PUBLICATIONS

Kitani et al., "Large-Capacity Optical Disk Files", *Hitachi Review*, vol. 33, No. 3, Jun. 1984.

*Primary Examiner*—Raulfe B. Zache
*Attorney, Agent, or Firm*—Antonelli, Terry & Wands

[57] ABSTRACT

Main data records are recorded in a first area of a non-rewritable optical disk and index records used for retrieving the main data records are recorded in a second area. Each index record includes a code data to be used as an index, and a provisional order which is an order of the code data to be registered, occupying in the code data already registered in the second area. Prior to the data retrieval, the index records are sequentially read out of the second area of the optical disk, the latest index record first, and a sorted index table is prepared in parallel with the readout of the index records by referencing the provisional orders. The data record is retrieved by searching the designated index code data on the index table, reading out a pointer stored in the table in paired relation with the index code and reading out the main data record from the first area of the optical disk.

21 Claims, 13 Drawing Sheets

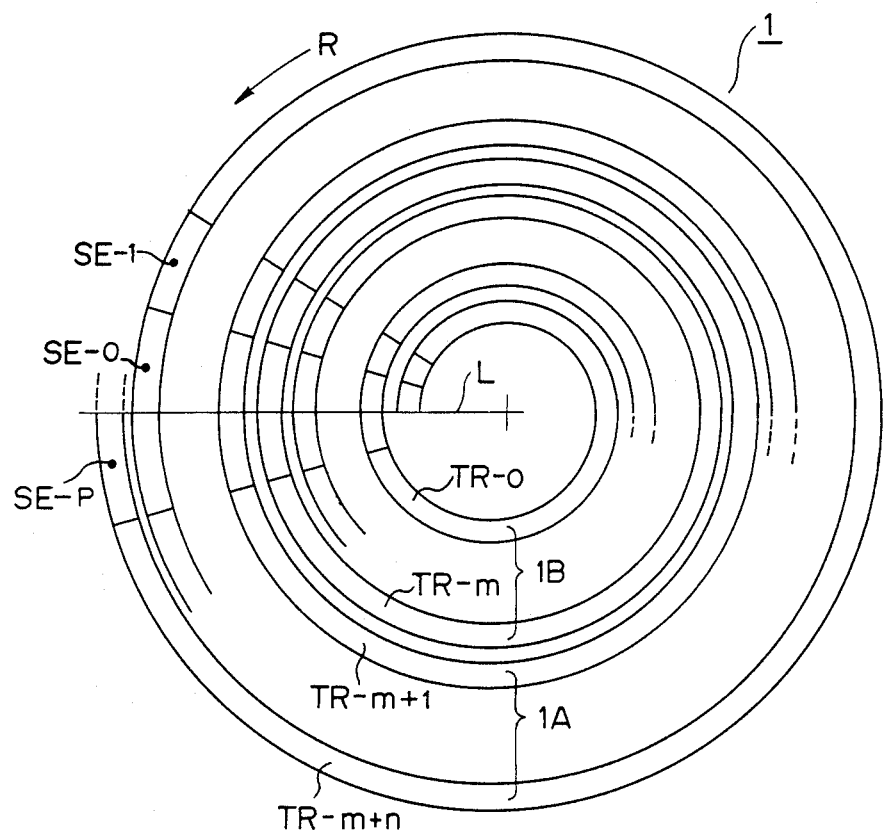
F I G. 2

FIG. 3

| 51 | 52 | 53 | 54A | 55A | 54B | 55B | 54C | 55C | 56 | 57 |
|----|----|----|-----|-----|-----|-----|-----|-----|----|----|
| WS | BN | FLAG | TITLE | QN1 | NAME | QN2 | DATE | QN3 | POINTER | SIZE |

| 61 | 62 | 63 | 64 |
|----|----|----|----|
| WS | BN | FLAG | IMAGE |

| DATA NO. | TITLE | QN1 | | POINTER | SIZE | |
|---|---|---|---|---|---|---|
| 1 | C | 1 | | P + 0 | 1 | ~50 |
| 2 | D | 2 | | P + 1 | 1 | |
| 3 | A | 1 | | P + 2 | 1 | |
| 4 | H | 4 | | P + 3 | 1 | |
| 5 | B | 2 | | P + 4 | 1 | |
| 6 | G | 5 | | P + 5 | 1 | |
| 7 | F | 5 | | P + 6 | 1 | |
| 8 | E | 5 | | P + 7 | 1 | |

| $A_i(X)$ | TITLE | POINTER | SIZE |
|---|---|---|---|
| 1 | A | P + 2 | 1 |
| 2 | B | P + 4 | 1 |
| 3 | C | P + 0 | 1 |
| 4 | D | P + 1 | 1 |
| 5 | E | P + 7 | 1 |
| 6 | F | P + 6 | 1 |
| 7 | G | P + 5 | 1 |
| 8 | H | P + 3 | 1 |

| X=QN | $A_0(X)$ | $A_1(X)$ | $A_2(X)$ | $A_3(X)$ | $A_4(X)$ | $A_5(X)$ | $A_6(X)$ | $A_7(X)$ |
|---|---|---|---|---|---|---|---|---|
| 1 | 1 | 1 | 1 | 1 | 1 | 1 | •3 | 3 |
| 2 | 2 | 2 | 2 | 2 | •3 | 3 | •4 | — |
| 3 | 3 | 3 | 3 | 3 | •4 | 4 | — | — |
| 4 | 4 | 4 | 4 | 4 | •8 | — | — | — |
| 5 | 5 | •6 | •7 | •8 | — | — | — | — |
| 6 | 6 | •7 | •8 | — | — | — | — | — |
| 7 | 7 | •8 | — | — | — | — | — | — |
| 8 | 8 | — | — | — | — | — | — | — |

F I G. 10A
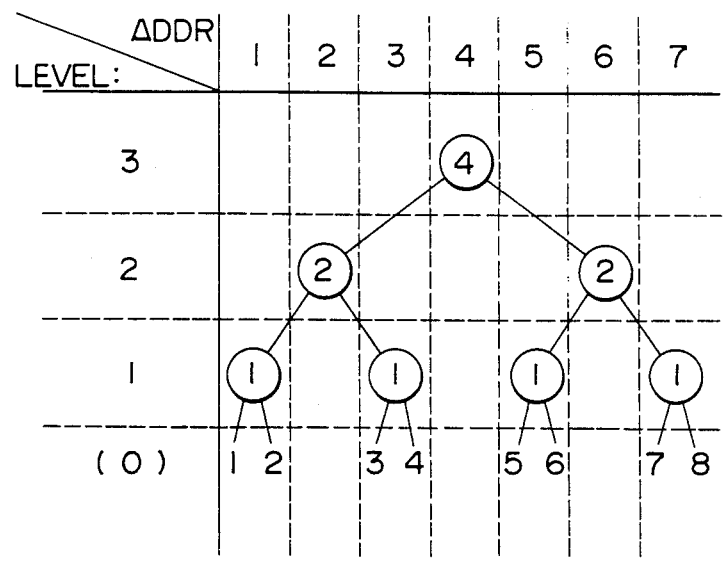
F I G. 10B
| ADDR | B(K) | |
|---|---|---|
| 1 | 1 | 43' |
| 2 | 2 | |
| 3 | 1 | |
| 4 | 4 | |
| 5 | 1 | |
| 6 | 2 | |
| 7 | 1 | |
| 8 | — | |

F I G. 12B
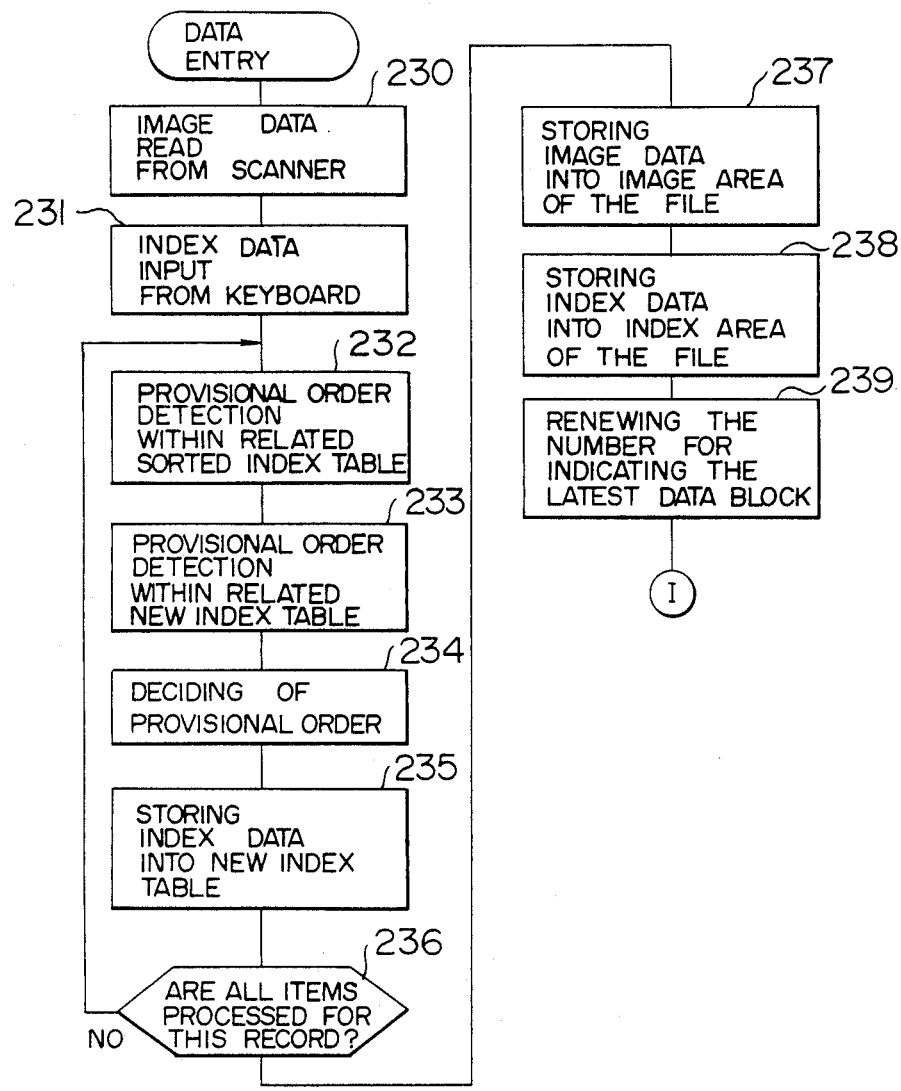

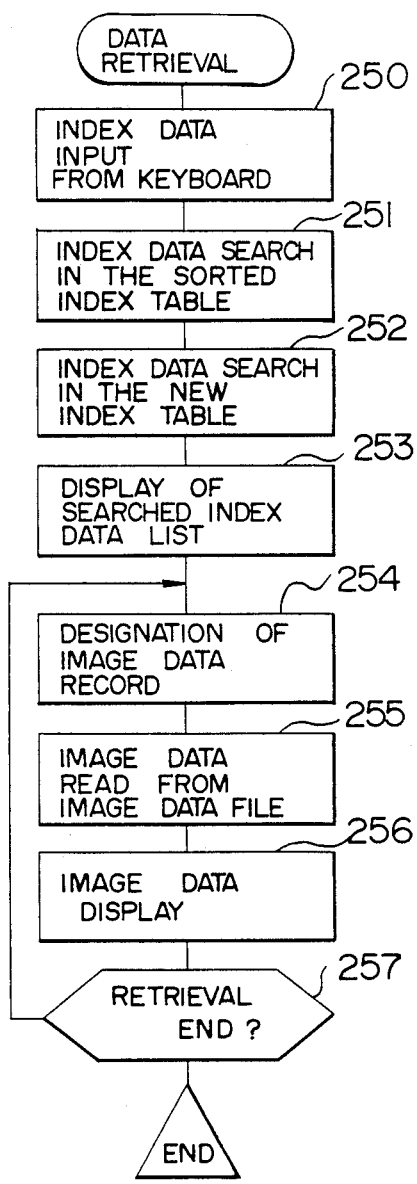

METHOD FOR STORING DATA INTO A FILE DEVICE AND FOR DATA RETRIEVAL

BACKGROUND OF THE INVENTION

1. Field of the Invention

The present invention relates to a method for registering (storing) data into a file device and a data retrieval method, and more particularly to a method for registering data into a file device in an information retrieval system for retriving a data record having a designated index from the file device which comprises a record medium which is hard to rewrite recorded information, and a data retrieval method for such registered data.

2. Description of the Prior Art

In a field of office automation, there is an increased need to electronically file a large volume of text as image data by utilizing an optical disk which has a large information storage capacity and can record code data.

The optical disk which can record image data as well as code data and can additionally record newly created data is disclosed in articles entitled "A Large Capacity Optical Disk File Device Capable of Recording Code Information" by Y. Tsunoda et al, NIKKEI ELECTRONICS, Nov. 21, 1983, Nikkei McGrow Hill, pp. 189-213 or "Large Capacity Optical Disc File" by Hiroshi Kitani and Yoshito Tsunoda, Hitachi Review, Vol. 33-No. 3, June 1984; pp. 109-118. The presently practical optical disk device capable of additionally recording data described in the above article has advantages of high recording density and large storage capacity and also has disadvantages of (a) disability of physically erasing data recorded on the disk or rewriting the data with other data, and (b) lower data readout speed than that of a device which uses another recording medium such as a magnetic disk.

The above disadvantage (a) renders it practically difficult to sort code data such as text titles or key words which are stored in the optical disk and used as indices in text retrieval in alphabetic sequence or kana sequence can store them together with image data of the texts in the optical disk, because such index data must be resorted, that is, rearranged on the file or updated each time one or a predetermined number of texts are added to the file. Thus, in the file device which uses such optical disk, when a title of a text is designated to retrieve the corresponding text, all of the text titles registered in the optical disk are sequentially read out and they are compared with the designated title. However, in the retrieval system which reads out all of the text titles, the disadvantage (b) appears dominatingly. As a result, as the volume of data stored increases, the data retrieval time increases, and the operability is lowered in an interactive text retrieval system.

SUMMARY OF THE INVENTION

It is an object of the present invention to speed of data retrieval in a file device which uses a record medium such as an optical disk which is incapable of physical rewriting or updating of recorded data.

In order to speed up the data retrieval in the file device which is incapable of rewriting the recorded data, all index data to be used as index keys are read out of the file device prior to the data retrieval, they are sorted in code sequence and written into a rewritable memory such as main memory or magnetic disk which permits high speed read/write operation, as an index look-up table. By sorting the indices in this manner, a record corresponding to a designated index data can be quickly found on the index look-up table by a high speed search method such as a binary search method, and the corresponding record data can be efficiently read out from the file device based on pointer information stored in pair with the index data on the index look-up table.

The index look-up table is prepared when the optical disk which is usually accommodated in a jacket to allow easy transportation or exchange of the optical disk by an operator, to an optical disk drive unit. If the volume of data (records) stored in the optical disk is large, a long time is required to sort the index data. If the index of each record has a plurality of items to facilitate the retrieval, a longer time is required to sort the index data.

It is another object of the present invention to speed up sorting of code data read out of the file device.

In accordance with the present invention, the above object is achieved by calculating an order of a new code data (herein called a provisional order) in the code data registered in the file device when the new index code data is to be additionally registered into the file device and storing the provisional order paired with the code data into the file device. The provisional order added to each code data represents a true order when it is calculated, but it is no longer the true order if a new code data having a higher priority order is additionally registered into the file device. It is important to note that the provisional order imparted to the code data lastly registered into the file device corresponds to the true order when all of the code data in the file has been sorted. The present invention makes use of this nature of the provisional order. Thus, the pairs of code data and provisional orders are sequentially read out starting from the code data lastly registered into the file unit and the code data is stored in memory areas corresponding to the provisional orders on the index look-up table. Once the code data is stored in one memory area on the index look-up table, the relationship between the provisional order and the code data memory area on the index table is changed each time the code data is stored such that the code data which is subsequently read out and has the same provisional order is stored in another memory area having a lower order than said memory area. This is effected by updating the content of the true order readout table which is addressed by the provisional order. By assigning the provisional orders to the code data in this manner, the sorted index look-up table can be prepared in parallel with the readout of the code data from the file device so that the index look-up table is completed immediately after all code data has been read out from the file device.

The foregoing and other objects, advantages, manner of operation and novel feature of the present invention will be understood from the following detailed description when read in connection with the accompanying drawings.

BRIEF DESCRIPTION OF THE DRAWINGS

FIG. 2 shows arrangement of data areas on an optical disk,

FIG. 3 shows a format of a record of an index file,

FIG. 4 shows a format of a record of an image data file,

FIG. 7A shows arrangement of data on the index file to explain a sort method for the index data in accordance with the present invention, FIG. 7B shows a content of a sorted index look-up table prepared in accordance with FIG. 7A, FIG. 7C shows a process for updating a content of an order conversion table used in index data sorting, FIGS. 10A and 10B shows a method for preparing the tree structure order conversion table on a memory, FIGS. 12A to 12C show flow charts for explaining operations of the filing system shown in FIG. 1.

DESCRIPTION OF THE PREFERRED EMBODIMENTS

The present invention is now explained in detail in connection with a text image filing system which uses an optical disk.

Figure 1:
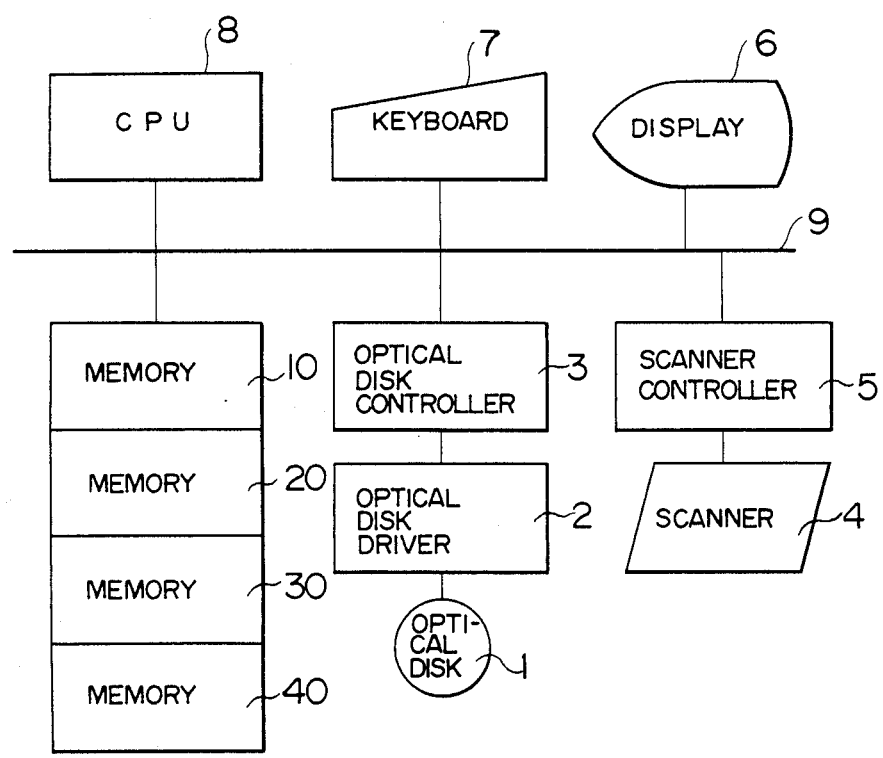
FIG. 1 is a block diagram of an overall configuration of a filing system.

FIG. 1 is a block diagram of an overall configuration of the text image filing system. Numeral 1 denotes an optical disk for storing text image data and code data which are used as indices of the texts, numeral 2 denotes an optical disk drive unit, numeral 3 denotes an optical disk control unit for controlling operation of the optical disk drive unit 2, numeral 4 denotes an image input device such as an image scanner for converting image data of a text to be entered to electrical signals, numeral 5 denotes a control unit for controlling operation of the image scanner 4, numeral 6 denotes a display device for displaying the image data and the index data read from the optical disk 1 and data and commands entered from a keyboard 7, numeral 8 denotes a data processing unit (CPU) for controlling operation of the overall filing system, numeral 10 denotes a first memory area for storing an index table used to retrieve an image data stored in the optical disk 1, numeral 20 denotes a second memory area for temporarily storing the image data, numeral 30 denotes a third memory area for storing a plurality of programs to be executed by the CPU 8, and numeral 40 denotes a fourth memory area for storing working data required by those programs and a conversion table for determining a provisional order of an index data. The first to fourth memory areas may be separate memories or different memory areas on one memory.

FIG. 2 shows an image data file area 1A and an index file area 1B on the optical disk 1. A continuous spiral track TR which runs from a center to a periphery of the optical disk 1 is formed on the optical disk 1. The track TR is divided into a plurality of tracks TR—0 to TR—m+n by a reference line L, with the track numbers 0—m+n being assigned starting from the innermost track. Each track is divided into a plurality of sectors SE—0 to SE-p which are minimum units of data block to be written or read, with the sector numbers 0—P being assigned in a sequence of passing of a read/write head when the optical disk 1 rotates in a direction R. In the present embodiment, the 0-th sector of the 0-th track TR—0 to the last sector of the m-th track TR-m are used as the index file area 1B for storing the indices which are code data, and the 0-th sector of the (m+1)th track TR—m+1 to the last sector of the (m+n)th track TR—m+n are used as the image data file area 1A for storing the text image data. The addresses of the sectors can be uniquely defined by the track numbers and the sector numbers. In the present embodiment, the block numbers are serially assigned starting from the 0-th sector of the 0-th track. For example, the j-th sector of the i-th track is defined as [i·(p+1)+j]th block.

FIG. 3 shows a format of an index record 50 recorded on the index file area 1B. The record 50 comprises a field which contains a sector mark (SM) 51 to indicate a sector start position, a field 52 which contains a block number (BN) of the sector, a field 53 which contains a flag to indicate whether a data has been written in the sector or not, fields 54A-54C which contain three items of index, fields 55A-55C which contain provisional orders (QN1-QN3) assigned to the indices, a pointer field 56 which contains a block number to indicate a leading sector of a plurality of sectors which contain the text image data corresponding to those indices, and a size field 57 which indicates a length of the text image data. In the present embodiment, three indices, a text title 54A, a text author name 54B and a text data registration date 54C are used for each text image.

FIG. 4 shows a format of an image data record 60 recorded in the image data file area 1A. Like the record 50, the record 60 has a sector mark (SM) field 61, a block number (BN) field 62 and a flag field 63 followed by a field 64 in which image data is recorded. A plurality of sectors which are serial in the image data file area 1A are assigned to each text depending on the length thereof.

The sector marks (SM) and the block numbers (BN) of the index record 50 and the image data record 60 have been written during the manufacture of the optical disk and other data are additionally recorded on the optical disk by the system of FIG. 1. The record also includes information necessary for synchronization in reading or writing data and information for data error check and correction, but they are omitted in FIGS. 3 and 4 because they are not pertinent to the present invention.

Figure 5:
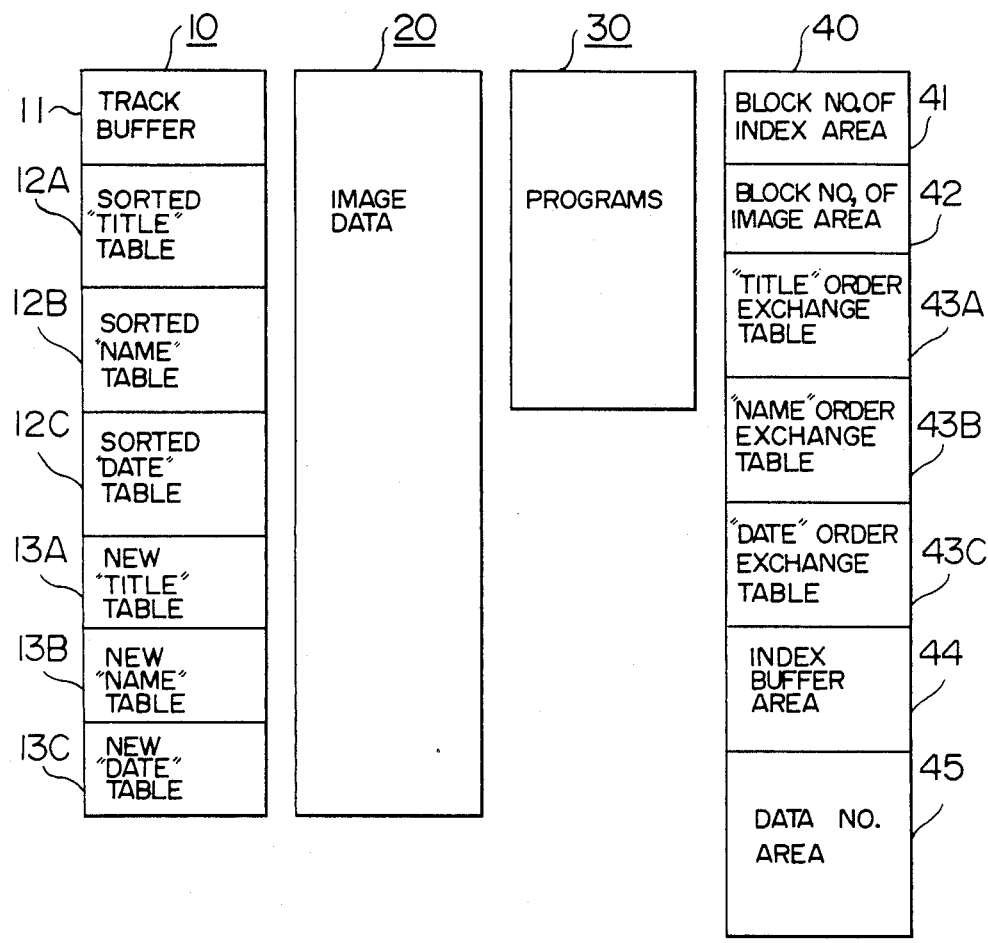
FIG. 5 shows detail of first memory area 10 to fourth memory area 40.

FIG. 5 shows detail of the memory areas 10-40. The first memory area 10 comprises a track buffer area 11 for temporarily storing one track of index data read from the index file 1B, sorted index table areas 12A, 12B and 12C in which the index data read from the index file 1B and sorted by item are stored, and new index table areas 13A, 13B and 13C in which index data additionally registered into the optical disk 1 after the preparation of the sorted index tables are stored item by item.

The fourth memory area 40 comprises an area 41 in which a block number for indicating a block in which the latest data in the index file 1B is stored (and a newly generated data is registered succeeding to that block) is stored, an area 42 in which a block number for indicating a block in which a latest data in the image data file 1A is stored, is stored, order conversion tables 43A-43C used to sort the index data read from the optical disk, an index buffer area 44 for temporarily storing index data entered from the keyboard 7 when the image data is registered, and a data number area 45 for temporarily storing the image data record numbers (the content of the pointer field 56) having the index corresponding to the designated index when the image is retrieved.

The registration and retrieval of the image data in the present filing system are now explained.

The optical disk 1 may be taken out of the optical disk drive unit 2 by a user to load it to another filing system, or the optical disk loaded to the drive unit 2 may be replaced by another optical disk.

In the present invention, each time the optical disk 1 is mounted to the drive unit, the content of the index file area 1B on the optical disk is read and the index data sorted by the index item are written into the index table areas 12A–12C. For example, when the index record on the index file area 1B is one shown in FIG. 6A, the index data are written into the areas 12A, 12B and 12C in the sorted table area 12 in a manner shown in FIG. 6B, in which titles and names are sorted in the alphabetic order and the dates are sorted in the ascending order. In sorting the index data read from the optical disk 1, the connectional sort algorithms described in "The Art of Computer Programming", Vol. 3, Sorting and Searching, by Knuth, published by Addison-Wesley, 1973, may be utilized, but in the present invention, in order to speed up the sorting with a small memory capacity, a new sort algorithm which uses the provisional orders QN1, QN2 and QN3 in preparing the sorted tables of the index data is proposed. Detail thereof will be explained later in connection with FIGS. 7A–11.

On the other hand, the index data to be additionally registered into the optical disk 1 after the preparation of the sorted index tables 12A–12C are stored in the new index table area 13 (areas 13A–13C) in the first memory area 10 in the registration order for each item.

Figures 6A, 6B:
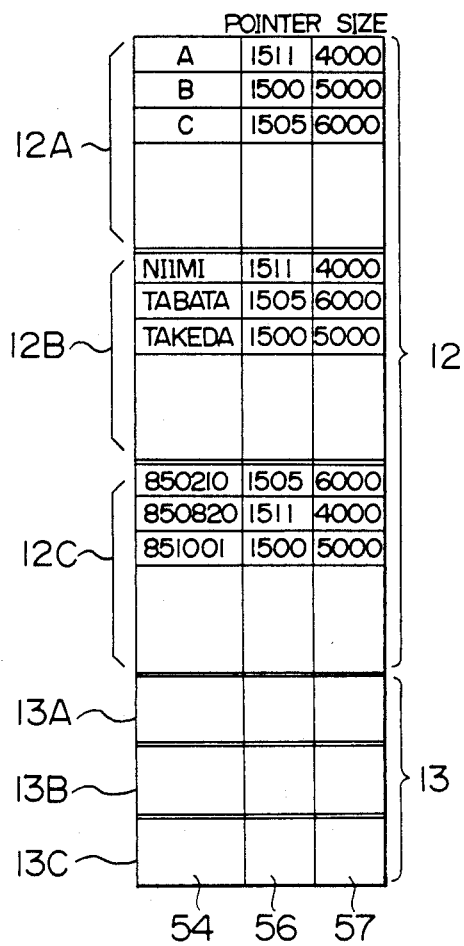
FIG. 6A shows a content of an index file 1B.
FIG. 6B shows a content of an index table prepared in correspondence to FIG. 6A.

As shown in FIG. 6B, the sorted index table 12 and the new index table 13 each includes an index 54, a pointer 56 to the text image record and a text image data size information 57, which are referenced in the image data retrieval process and the index provisional order determination in registering the image data.

When the image data is to be registered, data for the three items, TITLE, NAME and DATE are entered by the keyboard 7 as the index data for the image data, and they are stored into the index buffer area 44 of the fourth memory area 10. The index tables 12A and 13A, 12B and 13B and 12C and 13C are searched for those index data, and the orders QN1, QN2 and QN3 which the new indices occupy in the registered indices are determined. If an index of a higher priority is subsequently registered, the order QN1, QN2 or QN3 is no longer the true order. Accordingly, the orders QN1, QN2 and QN3 are provisional orders. Since the registered index data have been stored in the index tables 12A, 12B and 12C in the sorted form, the new index order to be registered can be determined for these tables by a high speed retrieval method such as a binary search method. On the other hand, in the new index tables 13A, 13B and 13C in which the index data are not sorted, the index data is sequentially read out to determine the orders of the new indices. The provisional order of the new index can be determined from a sum of the two orders determined by the sorted index table and the new index table. The provisional orders QN1, QN2 and QN3 for the respective items thus determined are paired with the index data and they are recorded in the index file area 1B in the record format shown in FIG. 3.

By using the provisional orders QN1, QN2 and QN3, the sorted index tables 12A, 12B and 12C can be prepared at a high speed in parallel with the readout of the index data from the optical disk. One example of sorting is now explained with reference to FIG. 7A which shows the content of the index record 50 on the optical disk, FIG. 7B which shows the content of the sorted table 12A for the title, and FIG. 7C which shows the content of the title order change table 43A to be used for sorting.

In FIG. 7A, the text title is represented by one alphabet character for convenience of explanation and the size of the text image data is assumed to be one sector length. A character P represents the block number of the leading sector in the image data area 1A, and the DATA NO. indicates the registration order of the text image data.

In the first data "C", the provisional order QN1 is "1" because there is no registered index at the time of registration. Because the second data "D" is of lower order in the alphabetic order than the registered data "C", the provisional order QN1 of the second data is "2", and because the third data "A" is of higher order than the data "C" and "D", the provisional order QN1 of the third data is "1". The provisional orders QN1 of the additional data "H", "B", "G", "F" and "E" are given as the orders at the time of registration. The provisional orders of the data except for the data "A", "B" and the lastly registered data "E" are shifted from the current true orders by the additional data registration. Thus, the conversion of the provisional order to the true order is done by using the conversion table 43A shown in FIG. 7C. This sort algorithm has an advantage that the comparison of data to be sorted is not necessary, the true data order can be calculated based on only the provisional orders and the data need be transferred to the table area 12A only once based on the determined order.

In FIG. 7C, $A_o(x) - A_n(x)$ show updating process of the order conversion table 43A. The character x indicates value of the provisional order QN, and $A_i(x)$ indicates the content of the conversion table (true order) at the end of the i-th order conversion. The principle of the sort algorithm which uses the conversion table resides in that it utilizes a nature that the later registered data has a provisional order which is closer to the true order and the lastly registered data has a provisional order which corresponds to the true order, and that the index data to be sorted is read out in the reverse sequence to that of registration, the true order $A_i(x)$ is determined based on the provisional order QN (=x), and the $A_i(x)$ is updated each time in preparation for the next conversion. The updating rule for $A_i(x)$ is to change the true order such that $A_{i+1}(x) = A_i(x+1)$ for the x higher than k, at the end of the conversion of the provisional order k to the true order $A_i(k)$.

In FIG. 7A, since the provisional order QN1 of the data "E" which is first read out is "5", the true order is $A_o(5) = $ "5" as determined from the conversion table 43A shown in FIG. 7C. Accordingly, the record of the data "E" is stored in the fifth area of the sorted index table 12A shown in FIG. 7B. In the conversion table 43A, $A_o(5) - A_o(7)$ are replaced by $A_o(6) - A_o(8)$ to produce $A_1(x)$. The provisional order "5" of the data "F" next read from the optical disk is converted to $A_1(5) = $ "6" and it is stored in the sixth area of the sorted index table 12A so that the conversion table is updated as shown by $A_2(x)$. The provisional orders x of the data "G"–"C" are read out, converted to $A_2(x) - A_7(x)$ and the index data are stored in the $A_i(x)$-th areas of the index table 12A. As a result, the table shown in FIG. 7B is produced. In FIG. 7C, the columns marked with "." show that the true orders have been updated.

Figure 8:
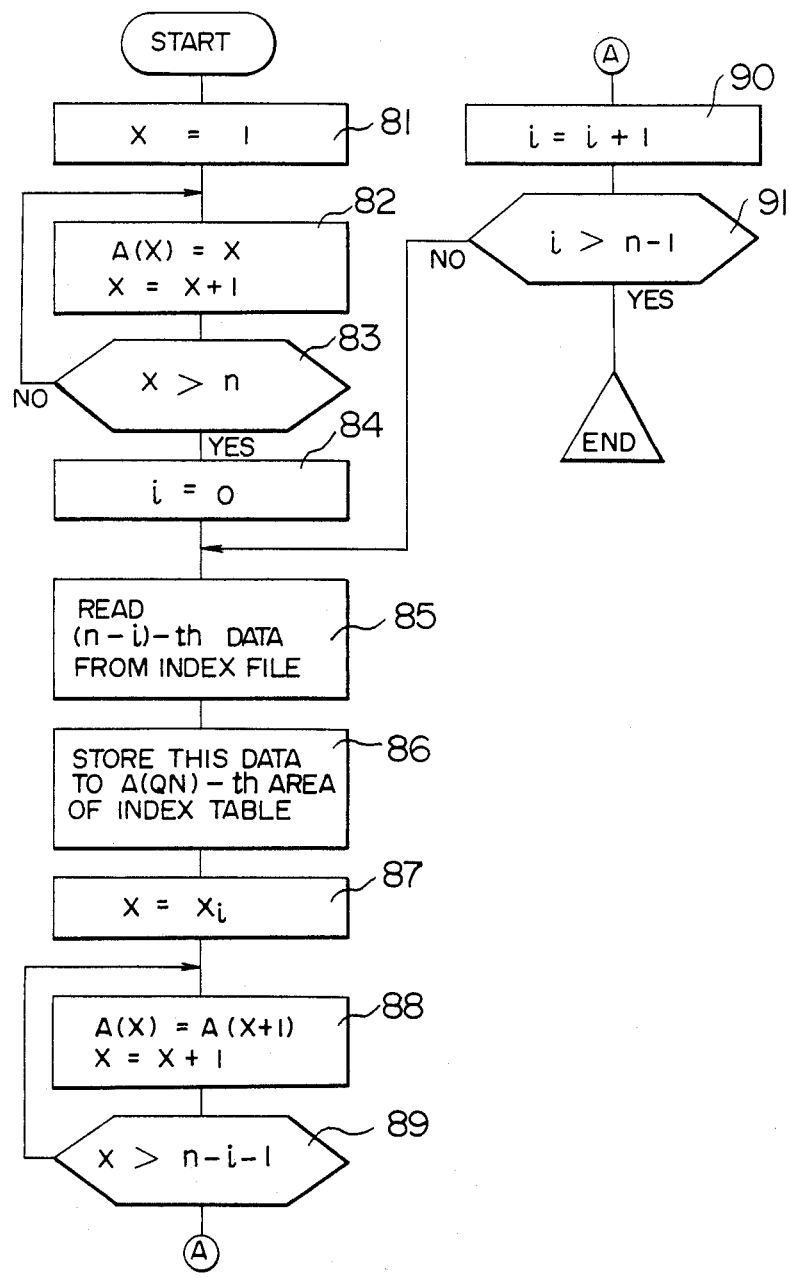
FIG. 8 shows a first embodiment of a program flow chart of a data sort method which uses the order conversion table.

The conversion table 43A makes use of the fact that when a provisional order is assigned to data at the time of registration, the true orders of the registered data having equal or higher provisional order to or than said provisional order are shifted down by one. FIG. 8 shows a program flow chart of preparation of the conversion table shown in FIG. 7C and sorting which utilizes the conversion table in steps 81-83, the content of the order conversion table 43A is initialized into $A_0(x)$. A parameter n represents the number of index data to be sorted. In a step 85, the index data is serially read out, the latest index record first, from the index area 1B on the optical disk. In a step 86, the true order is determined by referencing the order conversion table 43A and the index data is transferred to the table 12A. In steps 87-89, the order conversion table 43A is updated. In steps 90 and 91, the presence or absence of remaining data to be read from the index file is determined. In FIG. 8, the steps for one index item are shown. When there are three items, the steps 81-83 are executed for each of the conversion tables 43A-43C and the steps 85-89 are repeated for each index item. In the above-embodiment, the (n-i)th index data is read from the index file 1B in the step 85. Alternatively, one track of index records may be read from the index file 1B into the buffer area 11 at once, and the index data in the buffer area 11 may be serially read out, the latest one first, in the step 85.

Figure 9:
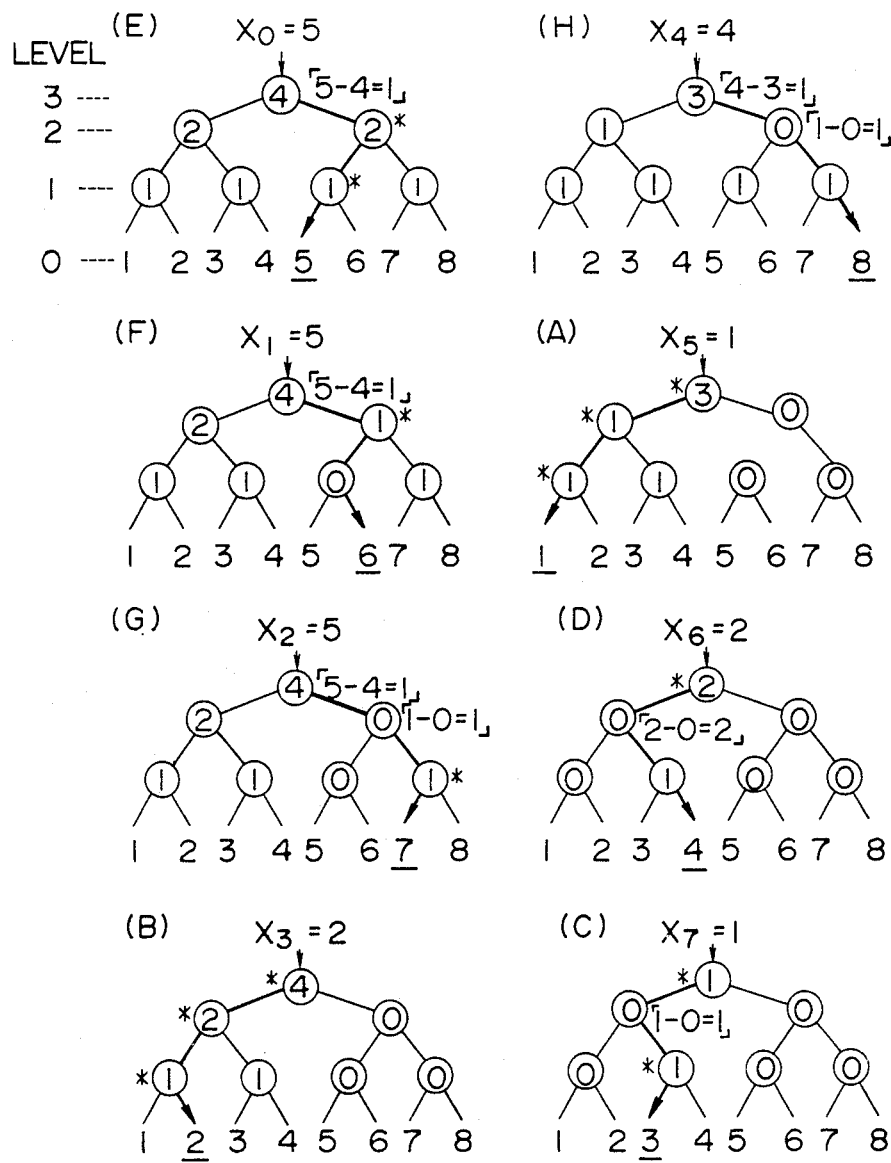
FIG. 9 illustrates a data sort method which uses a tree structure order conversion table.
Figure 11:
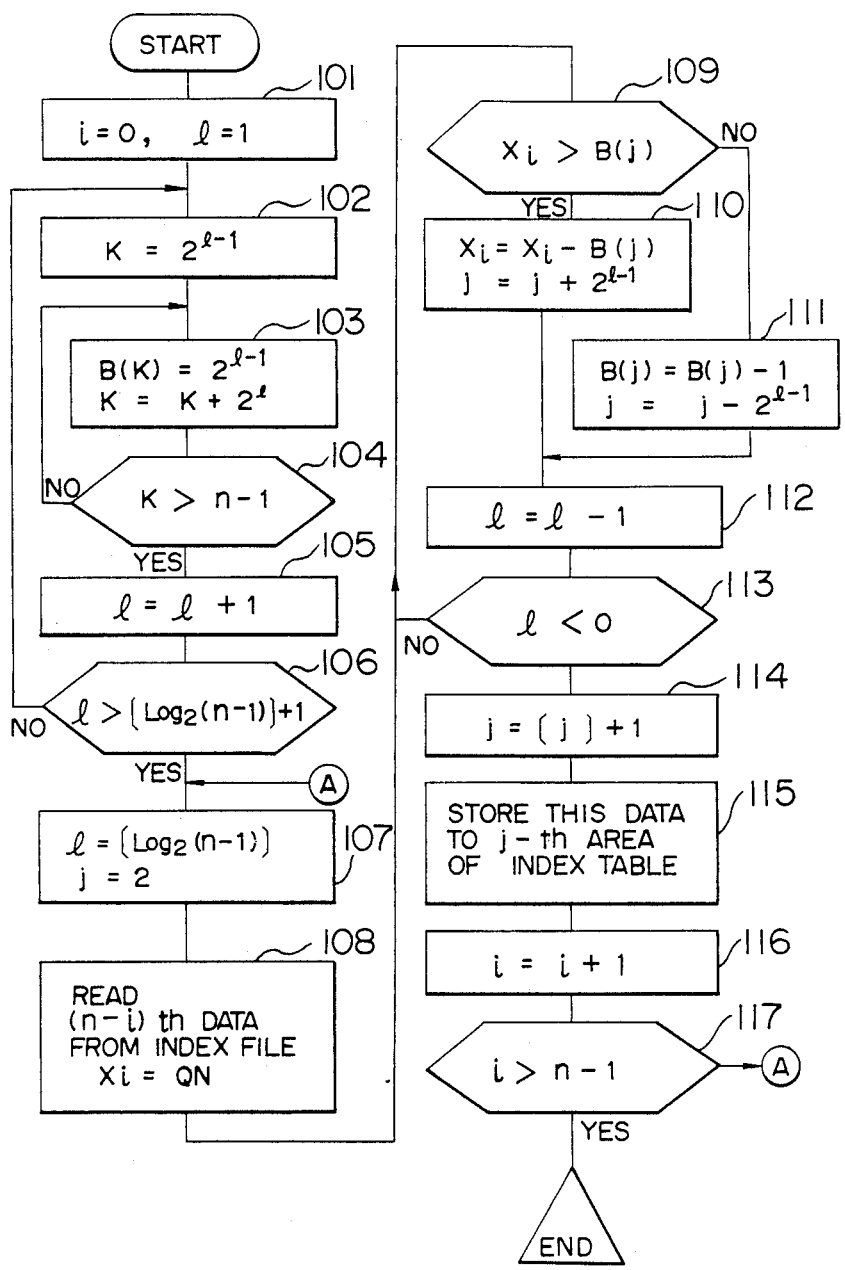
FIG. 11 shows a program flow chart for implementing the data sort method which uses the tree structure order conversion table.

FIGS. 9-11 show another embodiment of the sort algorithm which utilizes the provisional order QN. It is characterized to the use of a tree structure order conversion table. FIGS. 9E-9C show conversion steps from the provisional order to the true order for the index data "E"-"C" of FIG. 7A, respectively.

In FIG. 9, the conversion table is of tree structure having levels 0-3. In the level 0, numerals 0-8 which indicate the true orders are arranged from left to right, and values "1", "2" and "4" are assigned to the nodes of the levels 1, 2 and 3. A node value $2^{l-1}$ is assigned to each node, where l is the level of the node. The conversion of the provisional order to the true order by the conversion table and the updating of the table are carried out by applying the following rules for each mode from the high level (root) of the tree structure, that is, the top level to the low level (leaf).

[Rule 1] When the provisional order is larger than the node value, the provisional order is reduced by the node value and the process proceeds to the low level mode of the right root (having larger true order).

[Rule 2] When the provisional order is not larger than the node value, the node value is reduced by one and the process proceeds to the low level node of the left root.

For example, the provisional order (x0) of the data "E" first read out is "5" and the node value of the third level is "4". Accordingly, the Rule 1 is applied. Thus, x0 is charged to $5-4=1$, and the process proceeds to the right root as shown by a thick line. Since the updated x0 "1" in smaller than the node value "2" of the level 2, the Rule 2 is applied so that the node value is changed to $2-1=1$ and the process proceeds to the node of the level 1 of the left root. Again, the Rule 2 is applied and the node value is changed to $1-1=0$, and the process proceeds to the left root so that the level 0 or the true order "5" is reached and the conversion process ends.

In FIG. 9, the node marked with * indicates that the node value has been changed. The order conversion for the next data is carried out by utilizing the conversion table having the node value changed.

The above tree structure conversion table may be realized on a one-dimension memory in the following manner.

FIG. 10A shows a relationship between the tree structure and the conversion table address, and FIG. 10B shows a structure of the conversion table, a node of the level l of the precedence of the true order Y is stored in $\{(2\times[Y-1/2^l]+1)\times 2^{l-1}\}$th column on the table 43', where [ ] represents to throw away a fraction to produce an integer. In the tree structure conversion table 43', the level 0 or the true order corresponds to the suffix on the one-dimension array. Accordingly, the value need not be represented on the memory as the numeric array.

FIG. 11 shows a program flow chart of the sorting which utilizes a tree structure table. In this flow chart, B(K) represents the content (node value) of the order conversion table 43' shown in FIG. 10B, n represents the number of data, and $x_i$ represents the provisional order of the i-th data from the latest data (i=0 for the latest data). In steps 101-106, the node values B(K) of the order conversion table is initialized so that the table shown in FIG. 10B is prepared. In a step 107, a parameter l which indicates the highest level on the conversion table and a parameter j which indicates the node position are determined. In a step 108, the index records are sequentially read out of the index file 1B and the provisional orders are set into the parameter $x_i$. In a step 109, the provisional order $x_i$ is compared with the value B(j) of the node l. If $x_i$ is larger, the process proceeds to a step 110 where the provisional order is changed in accordance with the Rule 1 and the parameter j is changed, which corresponds to select the node of the right root on the tree structure. If $x_i$ is not larger than B(j), the node value and the parameter j are changed in a step 111 in accordance with the Rule 2. In a step 112, the level l of the node is decremented by one. If l is smaller than 0 (step 113), the process returns to the step 109 where the provisional order is compared with the next node value. After the comparison of the node level 1, the process proceeds to a step 114 where the parameter j is incremented by one and it is set as the true order. In a step 115, the index data is stored in the j-th area of the sorted table 12. In steps 116 and 117, presence or absence of remaining data is checked, and if it is present, the process returns to the step 107 and the above steps are repeated for the next index data. When a plurality of index items are included, the flow chart of FIG. 11 may be modified in accordance with the teaching of FIG. 8.

By using the tree structure conversion table, the number of times of updating of the table content is reduced compared to the conversion table shown in FIG. 7C. Thus, the processing speed is increased.

Figure 12A:
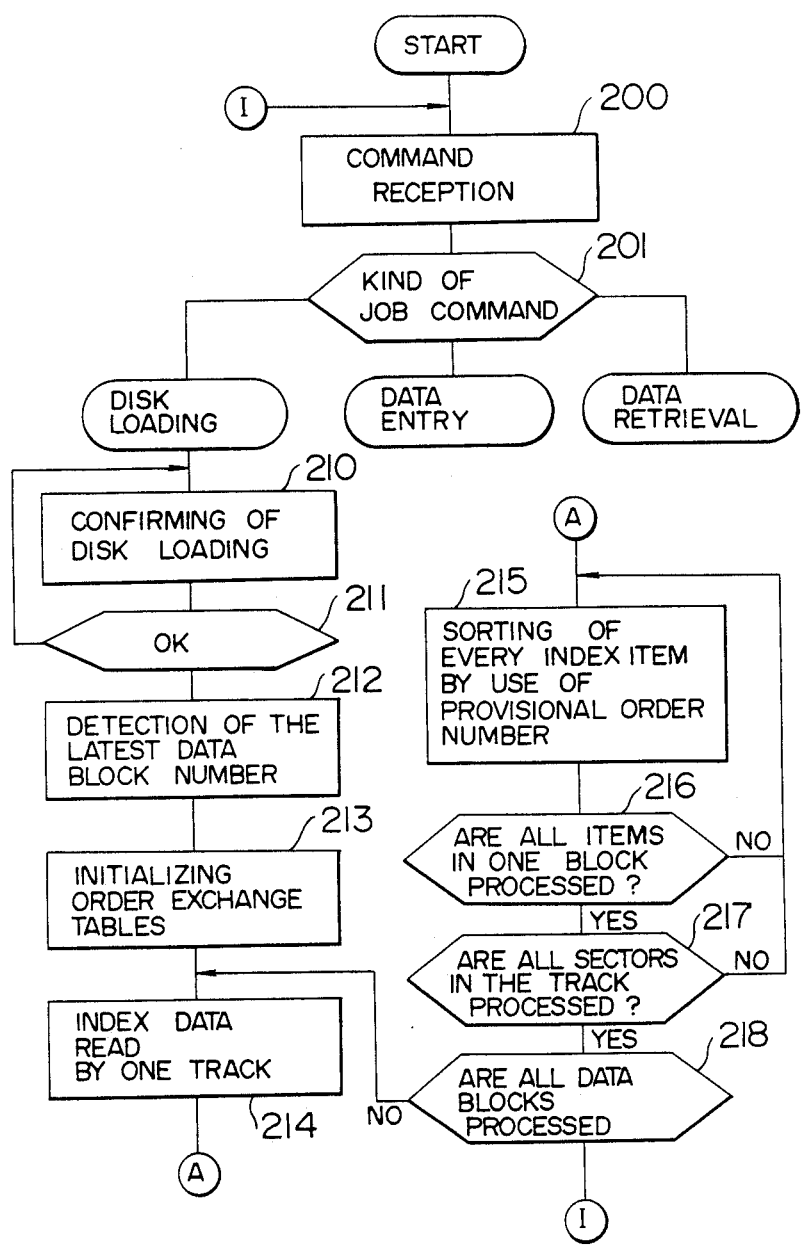

Referring to flow charts shown in FIGS. 12A-12C, the overall function of the data processing by the filing system of FIG. 1 is explained.

When an operator enters a command through the keyboard 7, the command is decoded as shown in FIG. 12A and the process proceeds to one of disk loading, data registration and data retrieval routines (steps 200-201).

In the disk loading routine, whether the optical disk 1 has been exactly loaded to the optical disk drive unit 2 or not is checked (steps 210, 211), the sector in which the latest index record is stored is searched from the index file area 1B, and the block number 52 is stored into the block number memory area 41 of the fourth memory (step 212). This may be carried out by sequentially accessing the index file area 1B and detecting the first sector whose flag field 53 indicates an unused record. In order to facilitate the block number search, a third file area may be provided on the optical disk, and each time one track of image data file 1A or one track of index file 1B is used, information which indicates the track may be recorded in the third file area. In a step 212, the track which contains the latest record is searched by referencing the third file area, and that track is directly accessed to read the latest record. In a step 212, the block number or the image data file 1A in which the text image record to be next registered is to be written is determined based on the contents of the pointer field 56 and the size field 57 in the latest index record 50, and it is stored in the block number area 42.

In steps 213–218, the sorted index tables 12A–12C are prepared. In the step 213, the order conversion tables 43A–43C are prepared for each index item. Those steps correspond to the steps 81–83 of FIG. 8, or the steps 101–106 of FIG. 11. In the step 214, one track of index records are sequentially written into the track buffer area 11 starting from the track containing the latest record, from the index file area 1B. In the steps 215–217, the index data of the index records in the track buffer area 11 are sorted, the latest one first, for each index item by using the provisional orders QN1–QN3 and the order conversion tables 43A–43C, and they are sequentially written into the sorted tables 12A–12C. After all records in the track buffer area 11 have been sorted, whether the processing for all registered index records has been completed or not is checked, and if there is unprocessed record, the process returns to the step 214, and if all records have been processed, the process returns to the command reception step 200. Because the sorting by the CPU 8 and the reading of data from the optical disk by the optical disk control unit 3 can be parallelly executed, two track buffers 11 may be provided on the first memory area 10 and the data may be processed such that the next track of data is written into one buffer while the index records in the other buffer are sorted. In this manner, the processing time can be further reduced.

In the data registration routine, as shown in FIG. 12B, the test image data entered from the image scanner 4 in a step 230 is entered into the second memory area 20. In a step 231, the index data entered from the keyboard 7 is written into the index buffer area 44. The sorted index table 12 and the new index table 13 (table 13A, 13B or 13C) are searched for each item, and the orders of the index currently entered in the registered indices are determined (steps 232, 233). A sum of the orders in both tables is taken as the provisional order of the index (step 234). The index data, the pointer of the image record stored in the memory area 42 and the image record length are added to the new index table 13 corresponding to the index item as the index records (step 235). The above steps are repeated for each index item (step 236). Then, the image data in the second memory area 20 are sequentially written into the sector designated by the pointer 42 in the image file area 1A (step 237), and the index records including the provisional orders are written into the sector designated by the pointer 41 in the index file area 1B (step 238). The image data to be registered and the block number to be used as the pointer to the index record are updated in a step 239.

In the data retrieval routine, as shown in FIG. 12C, the index data entered from the keyboard 7 is written into the buffer area 44 (step 250), the index tables 12 and 13 are searched for each item, and the corresponding index records are stored in the data number area 45 (steps 251 and 252). The result of retrieval by indices is displayed on the display unit 6 as a list including text title, name and registration data (step 253). If the user specifies desired one, the image data record is read out of the image file 1A based on the pointer 56 in the corresponding index record, and it is outputted onto the display device 6 (steps 254–256). If an end of retrieval command is entered from the keyboard 7, the process terminates, and if a select request for another image is entered, the process returns to the step 254 (step 257). The data displayed on the display device 6 may be outputted to a printer (not shown) by a command from the keyboard 7.

The present invention has been described in connection with the text image data filing system. The present invention can also be applied to a filing system for a record which consists of image data other than text and code data such as character, pattern or numeral. The data registration method and the retrieval method of the present invention which utilizes the provisional order is particularly effective to the file device having a physically non-rewritable optical disk as an information recording media, but this advantage is not lost in a file device which uses a physically rewritable information recording medium. In the above embodiment, the provisional order of the index is determined for each image data record and it is registered in the index file. Alternatively, the determination of the provisional order and the registration of the index record may be carried out one time for a plurality of image data so that the number of times of access to the optical disk is reduced. In the above embodiment, the image data file 1A and the index data file 1B are formed on the same recording medium. If the corresponding relationship between those files is assured, they may be formed on separate recording media.

In the conventional sort algorithm, all of the data to be sorted in the data file is temporarily transferred to a random access high speed memory and it is sorted. In the present invention, since the order after sorting can be determined immediately after one data to be sorted has been read from the data file, the sorting is attained rapidly with a small memory capacity. Thus, the present invention is extremely effective in preparing the index table for data retrieval.

We claim:

1. A method for registering a data record containing a code data to be sorted into a file device, comprising the steps of:

determining an order of a new code data contained in a data record to be newly registered, in code data already registered in said file device; and recording a new data record containing order information into said file device in a sequential relation to registered data records.

2. A method for registering a data record according to claim 1 wherein each data record includes a plurality of code data items, said order is determined for each item, and each record is registered in said file device with the code data and said order information being paired.

3. A method for registering a data record according to claim 1 further comprising the steps of:
   sorting the registered code data in said file device in a predetermined sequence and storing the sorted registered code data in a table in a memory separate from said file device,
   the order of said new code data being determined by referencing said table.

4. A method for registering a data record according to claim 3 wherein said step for sorting the code data includes the sub-steps of:
   sequentially reading out the code data and order information registered in said file device, beginning with the latest data record;
   assigning a storage location on said table to the code data read out in accordance with the order information read out and code data storage locations already assigned in said table; and
   storing the code data into the assigned storage location on said table.

5. A method for registering a data record according to claim 3 wherein each data record includes a plurality of code data items, said table comprises sub-tables one for each item, said registered code data are sorted and stored in corresponding sub-tables, the order of the code data of a new data record being determined for each item by referencing the corresponding sub-table, and each record having the code data and order information paired as registered in said file device.

6. A method for registering a data record according to claim 5 wherein said step for sorting coded data for each item includes the sub-steps of:
   sequentially reading data records registered in said file device, beginning with the latest data record;
   assigning a storage location on a sub-table to each code data contained in a readout data record in accordance with paired order information and a code data storage location assigned in a corresponding sub-table; and
   storing each code data at an assigned storage location on the corresponding sub-table.

7. A method for registering a data record according to claim 1 further comprising the steps of:
   sorting the code data registered in said file device in a predetermined sequence and storing sorted code data into a first table in a separate memory from said file device; and
   sequentially storing code data to be additionally registered in said file device after said sorting into a second table in a separate memory from said file device,
   the order of said new code data being determined by referencing said first and second tables.

8. A method for registering a data record according to claim 7 wherein said step for sorting the code data includes the sub-steps of:
   sequentially reading out the code data and the order information registered in said file device, beginning with the latest data record;
   assigning a storage location on said first table to the code data read out in accordance with order information read out and code data storage locations already assigned in said first table; and
   storing the code data into an assigned storage position on said first table.

9. A method for registering a data record according to claim 7 each data record includes a plurality of code data items, said first and second tables each includes a plurality of sub-tables for storing the code data for each item, the order of each code data in a new data record is determined for each item by referencing corresponding sub-tables in said first and second tables, and each data record paired with order information is registered into said file device.

10. A method for registering a data record according to claim 1 wherein said file device includes a recording medium which is hard to physically rewrite the registered data.

11. A method for registering a data record according to claim 3 wherein said file device includes a recording medium which is hard to physically rewrite the registered data, and said table includes a recording medium in which it is easy to physically update stored data.

12. A method for registering a data record including main data and code data to be used as an index to retrieve said main data, into a file device, comprising the steps of:
   registering the main data into a first file area of said file device;
   determining an order of the index to be newly registered, in registered indices; and
   recording an index record including a new index, order information and pointer information for indicating a relation of said index to the main data into a second file area of said file device in a sequential positional relationship to registered index records.

13. A method for registering a data record according to claim 12 further comprising a step of:
   sorting registered indices in a predetermined sequence and storing the sorted registered indices into a first table area in a memory separate from said file device;
   the order of a new index being determined by referencing said table area.

14. A method for registering a data record according to claim 13 wherein said sorting step includes the sub-steps of:
   sequentially reading index records registered in said second file area, beginning with the latest one;
   assigning storage locations on said first table area to indices contained in index records in accordance with order information contained in readout index records and data storage locations already assigned in said first table area; and
   storing indices into assigned storage locations in said first table area.

15. A method for registering a data record according to claim 14 further comprising a step of:
   sequentially storing indices to be registered into said file device after sorted indices have been stored into said first table area, into a second table area in a memory separate from said file device;
   the order of a new index being determined by referencing said first and second table areas.

16. A method for registering a data record according to claim 15 wherein each data record includes a plurality of index items, said first and second table areas each including a plurality of sub-tables for storing indices for each item, orders of the indices being determined item by item, and each index record having an index and order information paired as stored in said first file area.

17. A method for registering a data record according to claim 13 wherein said file device includes a record medium which is hard to physically rewrite the registered data and said memory includes a recording medium which is easy to physically update the stored data.

18. In a data retrieval system utilizing a file medium having main records containing main data recorded in a first file area and index records containing index code data for retrieving a main record recorded in a second file area, a method for retrieving at least one main record corresponding to a designated index from said file medium, comprising the steps of:

adding information for indicating an order of an index code data contained in each index record, in the index code data already registered in said second file area, to each index record to be newly recorded into said second file area;

sequentially reading out all index records, beginning with the latest one, from said second file area prior to the data retrieval and storing a data set including at least an index code data and pointer information indicating location of the corresponding main record into a storage location in a first retrieval table area in memory means of said data retrieval system in accordance with order information contained in the readout index record;

searching the index code data designated for the data retrieval in said first retrieval table and storing the pointer information which points to the corresponding main record; and reading out the main record from said first file area in accordance with the stored pointer information.

19. A method for retrieving a data record according to claim 18 wherein the index records are read from said second file area when said file medium is loaded into said data retrieval system.

20. A method for retrieving a data record according to claim 18 further comprising the steps of:

storing a data set including index code data corresponding to an additional index record and pointer information into a second retrieval table area in memory means in said data retrieval system when new main record and index record are to be additionally registered into said file medium after data sets have been registered into said first retrieval table area; and searching the index code data designated for the data retrieval in said second retrieval table area, and storing the pointer information which points the corresponding main record together with the pointer information seached in said first retrieval table.

21. A method for retrieving a data record according to claim 18 wherein said file medium has a plurality of tracks for storing information, said second file area includes a plurality of tracks each capable of recording a plurality of index records, the index records are read out from said second file area for each track prior to the data retrieval, and data sets are serially stored into said first retrieval table area, beginning with the latest index record in each track.

* * * * *